United States Patent
Yin

(10) Patent No.: US 11,054,683 B2
(45) Date of Patent: Jul. 6, 2021

(54) FLEXIBLE DISPLAY PANEL AND PREPARING METHOD THEREOF

(71) Applicant: WUHAN CHINA STAR OPTOELECTRONICS TECHNOLOGY CO., LTD., Hubei (CN)

(72) Inventor: Bingkun Yin, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 16/469,159

(22) PCT Filed: Mar. 13, 2019

(86) PCT No.: PCT/CN2019/077988
§ 371 (c)(1),
(2) Date: Jun. 13, 2019

(87) PCT Pub. No.: WO2020/124810
PCT Pub. Date: Jun. 25, 2020

(65) Prior Publication Data
US 2020/0218111 A1 Jul. 9, 2020

(30) Foreign Application Priority Data

Dec. 18, 2018 (CN) .......................... 201811550445.1

(51) Int. Cl.
*G02F 1/1333* (2006.01)
*G02B 1/14* (2015.01)

(52) U.S. Cl.
CPC ......... *G02F 1/133305* (2013.01); *G02B 1/14* (2015.01); *G02F 2202/28* (2013.01)

(58) Field of Classification Search
CPC ........... G02F 1/133305; G02F 1/13458; G02F 1/133528; G02F 1/136286;
(Continued)

(56) References Cited

U.S. PATENT DOCUMENTS 9,933,870 B2 * 4/2018 You .......................... G06F 3/041
10,254,573 B2 * 4/2019 Kwon ............... G02F 1/133305
(Continued)

FOREIGN PATENT DOCUMENTS

CN 206863388 U 1/2018
CN 108845445 A 11/2018
(Continued)

*Primary Examiner* — Hoan C Nguyen
(74) *Attorney, Agent, or Firm* — Mark M. Friedman

(57) ABSTRACT

A flexible display panel and a method for preparing thereof are provided. The method for preparing the flexible display panel includes providing a glass substrate and applying a thermosetting polymer on the glass substrate; curing the thermosetting polymer thereon into a solid film by baking; removing the solid film on a surface of a bonding region to expose a surface of the glass substrate underneath; forming a buffer layer on a surface of the solid film and the surface of the glass substrate from which the solid film has been removed; forming a metal layer on the buffer layer; forming a solder pad and metal wiring in the bonding region of the metal layer; attaching a chip to the solder pad of the bonding region after finishing bonding and sawing of a panel unit; and removing the glass substrate outside the bonding region and a transition region.

15 Claims, 5 Drawing Sheets

(58) Field of Classification Search
CPC ..... G02F 2001/136222; G02F 2202/28; G02F 1/13454; H01L 27/1225; H01L 27/124; H01L 27/3276; G02B 1/14
See application file for complete search history.

(56) References Cited

U.S. PATENT DOCUMENTS

| | | | |
|---|---|---|---|
| 10,409,096 B2* | 9/2019 | Odaka | H01L 51/0097 |
| 2002/0031868 A1* | 3/2002 | Capote | H01L 24/29 438/126 |
| 2006/0012744 A1* | 1/2006 | Wang | G02F 1/13452 349/151 |
| 2013/0088662 A1* | 4/2013 | Watanabe | G09F 9/301 349/58 |
| 2014/0132487 A1* | 5/2014 | Park | G02F 1/13454 345/55 |

FOREIGN PATENT DOCUMENTS

| | | |
|---|---|---|
| CN | 108966485 A | 12/2018 |
| CN | 208225380 U | 12/2018 |

\* cited by examiner

FLEXIBLE DISPLAY PANEL AND PREPARING METHOD THEREOF

FIELD OF INVENTION

The present invention relates to the field of display technology, and in particular, to a flexible display panel and a preparing method thereof.

BACKGROUND OF INVENTION

Flexible displays have many advantages, such as being light in weight, small size, thinness, portability, and impact resistance, and they can be adapted to various kinds of working environments.

Technical Problem

Flexible displays have many advantages as described above, however, an integrated circuit (IC) must be attached to a solder pad of a flexible substrate in the manufacture of the flexible displays. Because the flexible substrate has a larger thermal expansion coefficient compared to a glass substrate, a bonding misalignment issue of the IC in the manufacture of the flexible displays due to thermal expansion and contraction of the solder pad is a major challenge.

Technical Solution

In order to solve the above problems, the present invention provides a flexible display panel, including:
a display region having a first flexible substrate and a second flexible substrate, wherein the display region is configured for displaying an image; a bonding region having a rigid substrate and provided with a solder pad for attaching a chip, wherein the solder pad is formed on the rigid substrate; and a transition region having the second flexible substrate overlying the rigid substrate and located between the display region and the bonding region; wherein the second flexible substrate extends from the display region and overlies the rigid substrate at the transition region.

Preferably, the display region further includes a color filter, liquid crystals, a metal layer, and a buffer layer.

Preferably, a buffer layer is included between the solder pad and the rigid substrate.

Preferably, the transition region further includes a buffer layer and a metal layer.

Preferably, the area of the bonding region is between ⅙ and ⅒ of the area of the display region.

Preferably, the first flexible substrate and the second substrate are composed of polyimide.

Preferably, the rigid substrate is a glass substrate.

The present invention also provides a method for preparing a flexible display panel, including:
providing a glass substrate and applying a thermosetting polymer on the glass substrate; curing the thermosetting polymer thereon into a solid film by baking; removing the solid film on a surface of the bonding region to expose a surface of the glass substrate underneath; forming a buffer layer on a surface of the solid film and the surface of the glass substrate from which the solid film has been removed; forming a metal layer on the buffer layer; forming a solder pad and metal wiring in the bonding region of the metal layer; attaching a chip to the solder pad of the bonding region after finishing a bonding and sawing of a panel unit and removing the glass substrate outside the bonding region and the transition region.

Preferably, the thermosetting polymer is polyimide.

Preferably, removal of the solid film of the bonding region is performed by a dry etch or a laser lift-off means.

Preferably, the buffer layer is formed by chemical vapor deposition means.

Preferably, the metal layer is formed by physical vapor deposition means.

Preferably, removal of the glass substrate outside the bonding region and the transition region is performed by at least one of laser cutting, cutter wheel cutting, and splitting means.

The present invention further provides a flexible display panel, including:
a display region having a first flexible substrate and a second flexible substrate, wherein the display region is configured for displaying an image, the display region further includes a color filter, liquid crystals, a metal layer, and a buffer layer;
a bonding region having a rigid substrate and provided with a solder pad for attaching a chip, wherein the solder pad is formed on the rigid substrate, a buffer layer is included between the solder pad and the rigid substrate; and a transition region having the second flexible substrate overlying with the rigid substrate and located between the display region and the bonding region, the transition region includes a buffer layer and a metal layer; wherein the second flexible substrate extends from the display region and overlies the rigid substrate at the transition region.

Preferably, an area of the bonding region is between ⅙ and ⅒ of an area of the display region.

Preferably, the first flexible substrate and the second flexible substrate is are composed of polyimide.

Preferably, the rigid substrate is a glass substrate.

Beneficial Effect

The flexible display panel produced by the method of the invention combines the advantages of a flexible substrate and a rigid substrate, it has bendable characteristic and a chip bonding region which has a low thermal expansion coefficient.

It can solve the problem that the flexible display panel only has a flexible substrate of high thermal expansion coefficient which results in an integrated circuit (IC) attaching misalignment issue due to thermal expansion and contraction phenomenon.

DETAILED DESCRIPTION OF PREFERRED EMBODIMENTS

Figure 1:
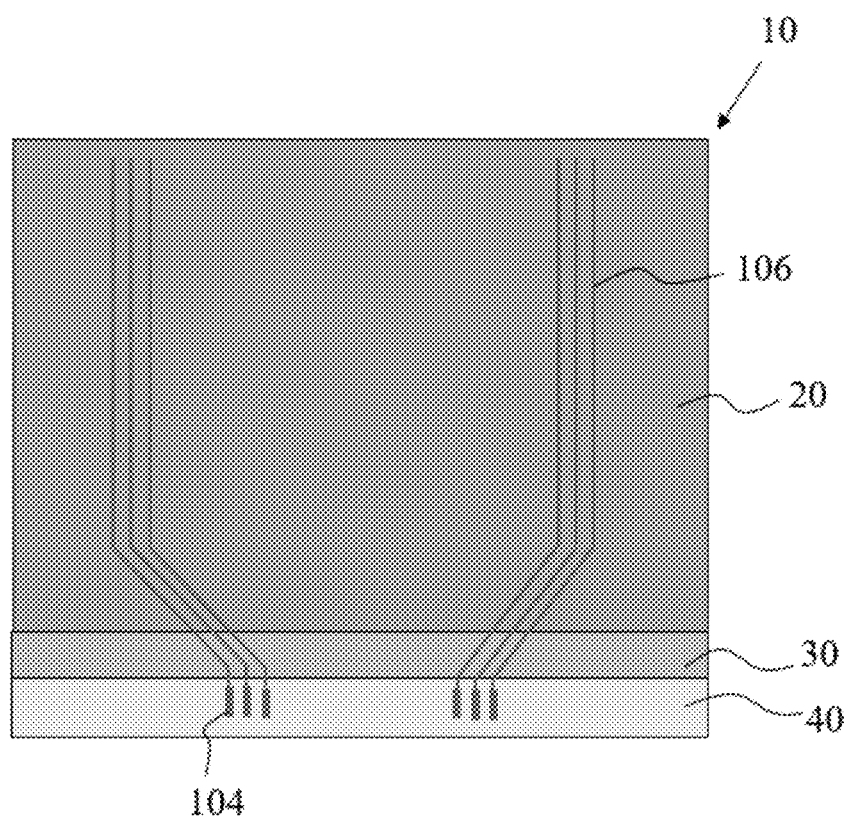
FIG. 1 is a schematic top view showing an arrangement of a flexible display panel according to a preferred embodiment of the present invention.

The following description of the various embodiments is provided to illustrate the specific embodiments of the invention. The directional terms mentioned in the present invention, such as "on," "below", "front", "behind", "left", "right", "inside", "outside", "side", etc., are merely references of the direction in the drawings. Therefore, the directional terminology used is for the purpose of illustration and understanding of the invention rather than limiting the invention. In the drawings, the structurally similar elements are denoted by the same reference numerals.

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

Figure 9:
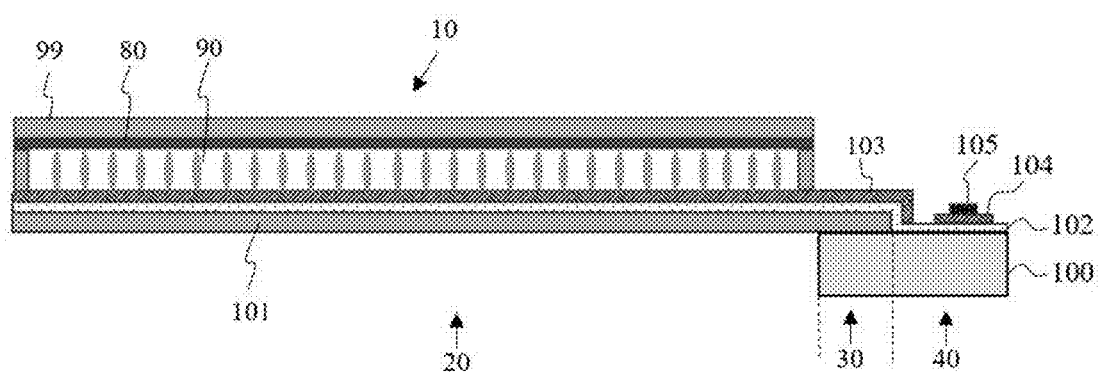
FIG. 9 is a schematic cross-sectional view of a film layer in step S8 of a method for preparing a flexible display panel according to a preferred embodiment of the present invention and also a schematic cross-sectional view of a flexible display panel according to a preferred embodiment of the present invention.

Please refer to FIG. 9, the present invention provides a flexible display panel 10, including:

a display region 20 having a first flexible substrate 99 and a second flexible substrate 101, wherein the display region 20 is configured for displaying an image; a bonding region 40 having a rigid substrate 100 and provided with a solder pad 104 for attaching a chip 105, the solder pad 104 is formed on the rigid substrate 100; and a transition region 30 having the second flexible substrate 101 overlying the rigid substrate 100 and located between the display region 20 and the bonding region 40; wherein the second flexible substrate 101 extends from the display region 20 and overlies the rigid substrate 100 at the transition region 30.

The display region 20 further includes a color filter 80, liquid crystals 90, a metal layer 103, and a buffer layer 102.

The buffer layer 102 is included between the solder pad 104 and the rigid substrate 100 in the bonding region 40.

The transition region 30 further includes a buffer layer 102 and a metal layer 103.

An area of the bonding region 40 is preferably between ⅙ and 1/10 of an area of the display region 20.

The present invention also provides a method for preparing the flexible display panel 10 shown in FIG. 1 and FIG. 9. Details are as follows.

Figure 2:
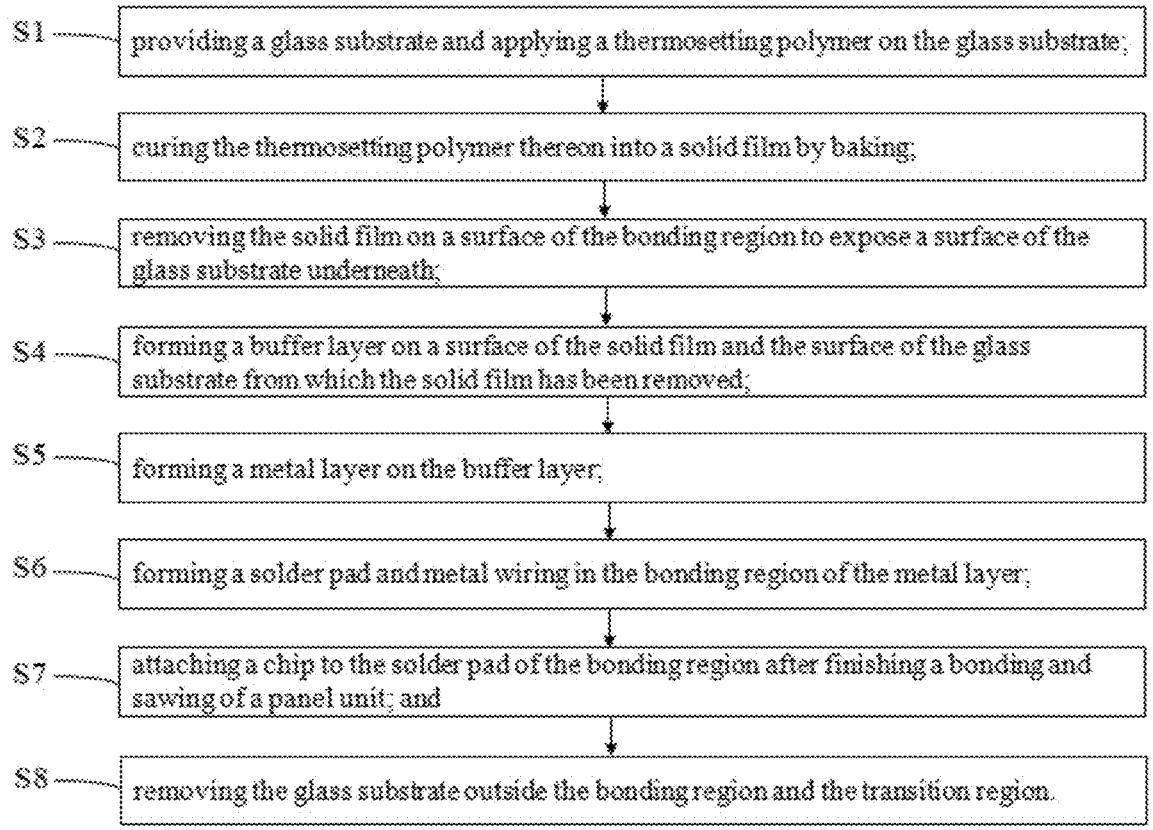
FIG. 2 is a flow chart of a method for preparing a flexible display panel according to a preferred embodiment of the present invention.
Figure 3:
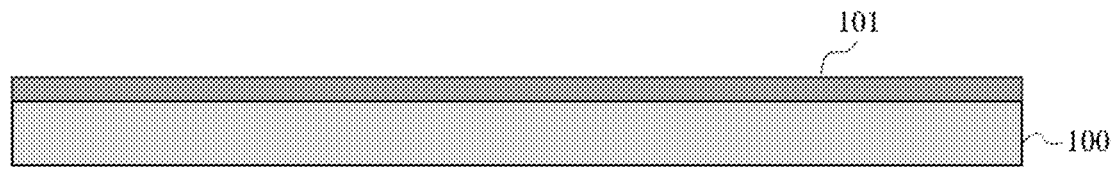
FIG. 3 is a schematic cross-sectional view showing a structure of a film layer in steps S1 and S2 of a method for preparing a flexible display panel according to a preferred embodiment of the present invention.

Please refer to FIG. 2 and FIG. 3, in step S1, providing a glass substrate 100 for an array process, and applying a thermosetting polymer on the glass substrate 100.

In the preferred embodiment, the thermosetting polymer is a polyimide (PI) polymer.

In step S2, a polyimide (PI) film is cured into a polyimide film 101 by baking.

Figure 4:
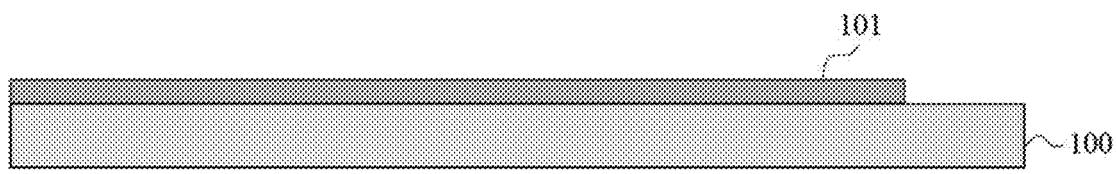
FIG. 4 is a schematic cross-sectional view showing a structure of a film layer in step S3 of a method for preparing a flexible display panel according to a preferred embodiment of the present invention.

Please refer to FIG. 2 and FIG. 4, in step S3, the polyimide (PI) film 101 as a surface of the bonding region is removed by means of dry etching or laser lift-off to expose a surface of the glass substrate 100 underneath.

Figure 5:
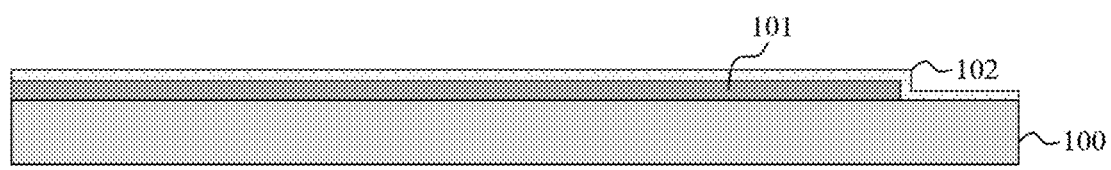
FIG. 5 is a schematic cross-sectional view showing a structure of a film layer in step S4 of a method for preparing a flexible display panel according to a preferred embodiment of the present invention.

Please refer to FIG. 2 and FIG. 5, in step S4, forming a buffer layer 102 composed of silicon nitride or silicon oxide on a surface of the polyimide film 101 and the glass substrate 100 from which the polyimide film has been removed by a chemical vapor deposition (CVD) method.

Figure 6:
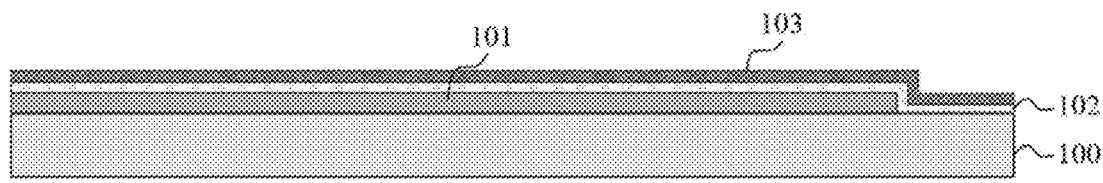
FIG. 6 is a schematic cross-sectional view showing a structure of a film layer in step S5 of a method for preparing a flexible display panel according to a preferred embodiment of the present invention.

Please refer to FIG. 2 and FIG. 6, in step S5, a metal layer 103, preferably indium tin oxide (ITO), is formed on the buffer layer 102 by a physical vapor deposition (PVD) method.

Figure 7:
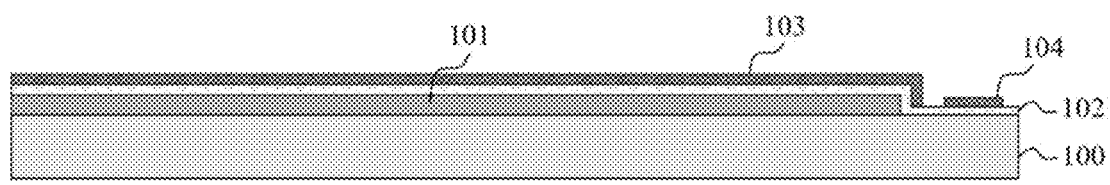
FIG. 7 is a schematic cross-sectional view showing a structure of a film layer in step S6 of a method for preparing a flexible display panel according to a preferred embodiment of the present invention.

Please refer to FIG. 2 and FIG. 7, in the process of step S6, the solder pad 104, a metal wire 106 (see FIG. 1), and other wires or electrodes are formed on the metal layer 103 by photoresist coating, exposure, development, etching, and photoresist stripping, etc. (known in the prior art, not shown).

Next, the glass substrate 100 on which the array process is completed is subjected to processes such as cleaning, polyimide film printing, polyimide film orientation, and sealant coating (conventional processes are not shown).

Figure 8:
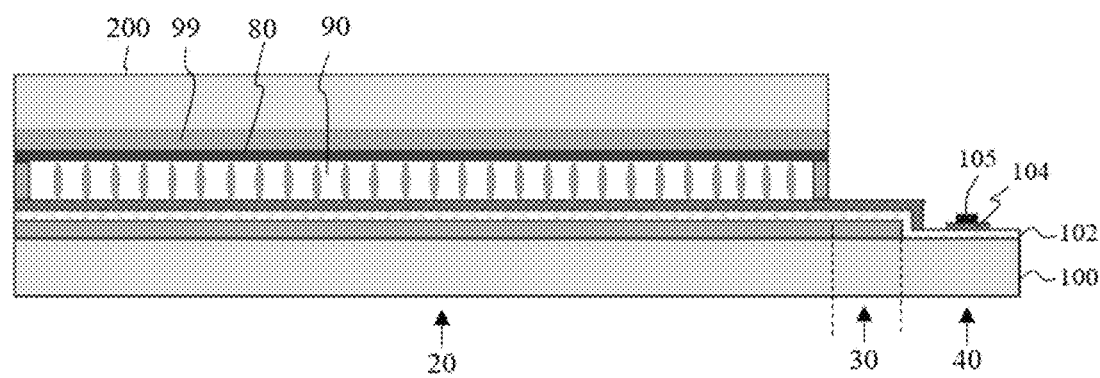
FIG. 8 is a schematic cross-sectional view showing a structure of a film layer in step S7 of a method for preparing a flexible display panel according to a preferred embodiment of the present invention.

Please refer to FIG. 8, following, another glass substrate 200 for a color filter (CF) process is provided, applying a thermosetting polymer on the glass substrate 200 (the same as the above-mentioned process, not shown).

In the preferred embodiment, the thermosetting polymer is a polyimide (PI) polymer.

Please refer to FIG. 8, after the polyimide (PI) polymer is cured into a PI film 99 by baking, the color filter 80 is formed on the PI film 99 (the conventional process is not shown). Following, precisely bonding the glass substrate 100 (on which the array process is completed and is subjected to processes such as cleaning, polyimide film printing, polyimide film orientation, sealant coating, and liquid crystal 90 injecting) to the glass substrate 200 coated with a polyimide film and on which the color filter 80 is formed (the details of the process are not shown).

Next, please refer to FIG. 2 and FIG. 8; in step S7, after bonding the glass substrate 100 (on which the array process is completed and is subjected to processes such as cleaning, polyimide film printing, polyimide film orientation, sealant coating, and liquid crystal 90 injecting) to the glass substrate 200 (coated with a polyimide film and on which the color filter 80 is formed), attaching the chip 105 to the solder pad 104 by a die bonder (the conventional process is not shown).

Please refer to FIG. 8 and FIG. 9 and together with FIG. 1 and FIG. 2, in step S8, after the glass substrate 100 is precisely bonding to the glass substrate 200, removing portions of the glass substrate 100 and the glass substrate 200 outside the bonding region 40 and the transition region 30 by at least one of laser cutting, cutter wheel cutting, and splitting means, that is, the portions of the glass substrate 100 and the glass substrate 200 in the display region 20 are removed.

By the above embodiments, a flexible display panel combining a flexible substrate and a rigid substrate can be obtained, which has bendable characteristics and a chip bonding region which has a low thermal expansion coefficient. It can solve the integrated circuit attaching misalignment issue caused by thermal expansion and contraction in the manufacture of a flexible display panel only having the flexible substrate.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A flexible display panel, comprising:
   a display region having a first flexible substrate and a second flexible substrate, wherein the display region is configured for displaying an image;
   a bonding region having a rigid substrate for bonding chips; and
   a transition region having the second flexible substrate overlying the rigid substrate, and the transition region is located between the display region and the bonding region;
   wherein a portion of a surface of the rigid substrate is bonded to the second flexible substrate to expose a remaining portion of the surface of the rigid substrate, the remaining portion of the surface of the rigid substrate is provided with a solder pad and a chip, and the chip is disposed on the solder pad; and
   wherein a buffer layer overlays the second flexible substrate and the remaining portion of the surface of the rigid substrate, and a metal wiring layer overlays the buffer layer, the second flexible substrate, and the remaining portion of the surface of the rigid substrate.

2. The flexible display panel according to claim 1, wherein a color filter and liquid crystals are further provided in the display region.

3. The flexible display panel according to claim 1, wherein an area of the bonding region is between 1/6 and 1/10 of an area of the display region.

4. The flexible display panel according to claim 1, wherein the flexible substrate is composed of polyimide.

5. The flexible display panel according to claim 1, wherein the rigid substrate is a glass substrate.

6. A method for preparing a flexible display panel, comprising:
   providing a glass substrate and applying a thermosetting polymer on the glass substrate;
   curing the thermosetting polymer thereon into a solid film by baking;
   removing the solid film on a surface of a bonding region to expose a surface of the glass substrate underneath;
   forming a buffer layer on a surface of the solid film and the surface of the glass substrate from which the solid film has been removed;
   forming a metal layer on the buffer layer;
   forming a solder pad and metal wiring in the bonding region of the metal layer;
   attaching a chip to the solder pad of the bonding region after finishing bonding and sawing of a panel unit; and
   removing the glass substrate outside the bonding region and a transition region.

7. The method for preparing the flexible display panel according to claim 6, wherein the thermosetting polymer is polyimide.

8. The method for preparing the flexible display panel according to claim 6, wherein removal of the solid film of the bonding region is performed by dry etching or a laser lift-off means.

9. The method for preparing the flexible display panel according to claim 6, wherein the buffer layer is formed by chemical vapor deposition.

10. The method for preparing the flexible display panel according to claim 6, wherein the metal layer is formed by physical vapor deposition.

11. The method for preparing the flexible display panel according to claim 6, wherein removal of the glass substrate outside the bonding region and the transition region is performed by at least one of laser cutting, cutter wheel cutting, and splitting.

12. A flexible display panel, comprising:
    a display region having a first flexible substrate and a second flexible substrate, wherein the display region is configured for displaying an image, and the display region comprises a color filter and liquid crystals;
    a bonding region having a rigid substrate for bonding chips; and
    a transition region located between the display region and the bonding region;
    wherein a portion of a surface of the rigid substrate is bonded to the second flexible substrate to expose a remaining portion of the surface of the rigid substrate, the remaining portion of the surface of the rigid substrate is provided with a solder pad and a chip, and the chip is disposed on the solder pad; and
    wherein a buffer layer overlays the second flexible substrate and the remaining portion of the surface of the rigid substrate, and a metal wiring layer overlays the buffer layer, the second flexible substrate, and the remaining portion of the surface of the rigid substrate.

13. The flexible display panel according to claim 12, wherein an area of the bonding region is between 1/6 and 1/10 of an area of the display region.

14. The flexible display panel according to claim 12, wherein the flexible substrate is composed of polyimide.

15. The flexible display panel according to claim 12, wherein the rigid substrate is a glass substrate.

* * * * *